US008195060B2

(12) United States Patent  
Itoh

(10) Patent No.: US 8,195,060 B2  
(45) Date of Patent: Jun. 5, 2012

(54) ELECTRONIC DEVICE, METHOD FOR FORMING ERROR INFORMATION OF ELECTRONIC DEVICE, AND IMAGE FORMING APPARATUS

(75) Inventor: Satoshi Itoh, Osaka (JP)

(73) Assignee: Kyocera Mita Corporation (JP)

( * ) Notice: Subject to any disclaimer, the term of this patent is extended or adjusted under 35 U.S.C. 154(b) by 417 days.

(21) Appl. No.: 12/614,718

(22) Filed: Nov. 9, 2009

(65) Prior Publication Data

US 2010/0119250 A1 May 13, 2010

(30) Foreign Application Priority Data

Nov. 11, 2008 (JP) ................. 2008-288627

(51) Int. Cl.
*G03G 15/00* (2006.01)
*G06F 3/041* (2006.01)
(52) U.S. Cl. ............... 399/81; 399/9; 399/10; 345/173
(58) Field of Classification Search .......... 399/9, 10, 399/75, 81; 345/173
See application file for complete search history.

(56) References Cited

U.S. PATENT DOCUMENTS

| 5,027,154 | A  | * | 6/1991 | Ujiie et al. ................ 399/10 X |
| 5,774,759 | A  | * | 6/1998 | Tanaka .............................. 399/8 |
| 7,330,676 | B2 | * | 2/2008 | Bardolatzy et al. ............ 399/81 |
| 7,697,850 | B2 | * | 4/2010 | Mathewson ...................... 399/8 |
| 8,045,877 | B2 | * | 10/2011 | Nakagoshi ...................... 399/81 |

FOREIGN PATENT DOCUMENTS

JP 2003-44326 2/2003

* cited by examiner

*Primary Examiner* — Sandra Brase
(74) *Attorney, Agent, or Firm* — Ostrolenk Faber LLP

(57) ABSTRACT

An electronic device includes a touch panel that includes an operation plane displaying various operation screens, and detects a press position on the operation screen as detection signal; a first storage portion that stores press information of the touch panel; a second storage portion that stores error information; a first control unit that stores the press position indicated by the detection signal from the touch panel as first press information in the first storage portion; a second control unit creates screen data with a mark indicating the press position on the operation screen when an error occurred, based on the first press information stored in the first storage portion, and stores the screen data as first error information in the second storage portion, when the error occurs in the electronic device; and a third control unit that outputs the error information based on an error information output command.

20 Claims, 5 Drawing Sheets

*FIG. 3*

| TOUCH PANEL PRESS INFORMATION NUMBER | TOUCH PANEL PRESS INFORMATION | | |
|---|---|---|---|
| | TOUCH PANEL PRESS POSITION | TOUCH PANEL PRESS TIME | TOUCH PANEL PRESS SCREEN ID |
| 0001 | (124, 111) | 2008/4/1 13:10:02 | W001 |
| 0002 | (198, 230) | 2008/4/1 13:23:16 | W002 |
| 0003 | (100, 166) | 2008/4/1 14:04:34 | W002 |
| 0004 | (146, 106) | 2008/4/1 14:10:50 | W002 |

ELECTRONIC DEVICE, METHOD FOR FORMING ERROR INFORMATION OF ELECTRONIC DEVICE, AND IMAGE FORMING APPARATUS

CROSS REFERENCES TO RELATED APPLICATIONS

The present invention claims priority on Japanese Patent Application No. 2008-288627, filed on Nov. 11, 2008, the entire contents of which are incorporated herein by reference.

FIELD OF THE INVENTION

The present invention relates to an electronic device including a touch panel, a method for forming error information of the electronic device, and an image forming apparatus.

BACKGROUND OF THE INVENTION

Various types of electronic devices, such as personal computers, mobile telephones, printers, multifunction peripheral and household electrical appliances, include hardware such as a central processing unit (CPU), a memory and the like, and software that executed by the CPU. Hardware and software in these electronic devices suffer a wide range of malfunctions due to various causes during various processes, such as operations processing, communications processing, and standby processing. For example, when there is a software design malfunction in the electronic device, it would bring the electronic problems such as that the electronic device might function in a way not intended by the developer, or it might not function at all. When the electronic device suffers a fatal malfunction such as these, the malfunction is analyzed and its cause is identified by the developer while the problem is caused in the development step, or by the manufacturer while in the manufacturing step, or by the maintainer while it is already on sale. Whoever analyzes the malfunction identifies its cause based on various types of information.

As a related technology, when an error occurs while executing an application, an LCD displays an error message screen over an application screen. In this related technology, when a user presses a 'Close' button displayed on the error message screen, image data including the error message screen and an application screen below this error message screen are stored as error information in the memory. Based on an output command of the error information, the LCD displays the error information, and thereby supplies information required for analyzing the malfunction to the person who is analyzing the malfunction.

SUMMARY OF THE INVENTION

The present invention aims to provide an electronic device with better work efficiency in analyzing malfunctions than conventional devices, a method for forming error information of an electronic device, and an image forming apparatus.

An electronic device according to an aspect of the present invention includes: a touch panel that includes an operation plane which displays various operation screens, and detects a press position on the operation plane as a detection signal; a first storage portion that stores press information of the touch panel; a second storage portion that stores error information; a first control unit that stores a press position indicated by the detection signal from the touch panel as first press information in the first storage portion; a second control unit that creates a screen data with a mark which indicates the press position on the operation screen when an error occurred, based on the first press information stored in the first storage portion, and stores the screen data as first error information in the second storage portion, when the error occurs in the electronic device; and a third control unit that outputs the error information based on an error information output command.

A method for forming error information of an electronic device according to another aspect of the present invention includes: detecting a press position of a touch panel; storing the press position of the touch panel as first press information of the touch panel in a first storage portion; determining an error caused in the electronic device; and creating a screen data with a mark which indicates the press position on the operation screen when the error occurred, based on the first press information stored in the first storage portion, and forming first error information based on the screen data, when the error has occurred.

An image forming apparatus according to another aspect of the present invention includes: an image forming portion that forms an image on a paper sheet; a touch panel that includes an operation plane which displays various types of operation screens, and detects a press position on the operation screen; a storage portion that stores at least press information of the touch panel; and a control unit that creates a screen data with mark which indicates the press position on the operation screen when the error occurred, based on the press position detected by the touch panel, and stores the screen data in the storage portion, when the error occurs in the image forming apparatus.

Other objects, characteristics, and advantages of the present invention will become clear from the following detail description and the accompanying drawings.

BRIEF DESCRIPTION OF THE DRAWINGS

FIG. 3 is a schematic view showing a touch panel press information table of a multifunction peripheral according to an embodiment of the present invention.

DESCRIPTION OF EMBODIMENTS

An embodiment of the present invention will be explained with reference to the drawings. This embodiment relates to a multifunction peripheral, which is one of image forming apparatus which belongs to an electronic device of the present invention. This multifunction peripheral has functions of copying, printing, scanning, and facsimile-transmitting/receiving.

Figure 1:
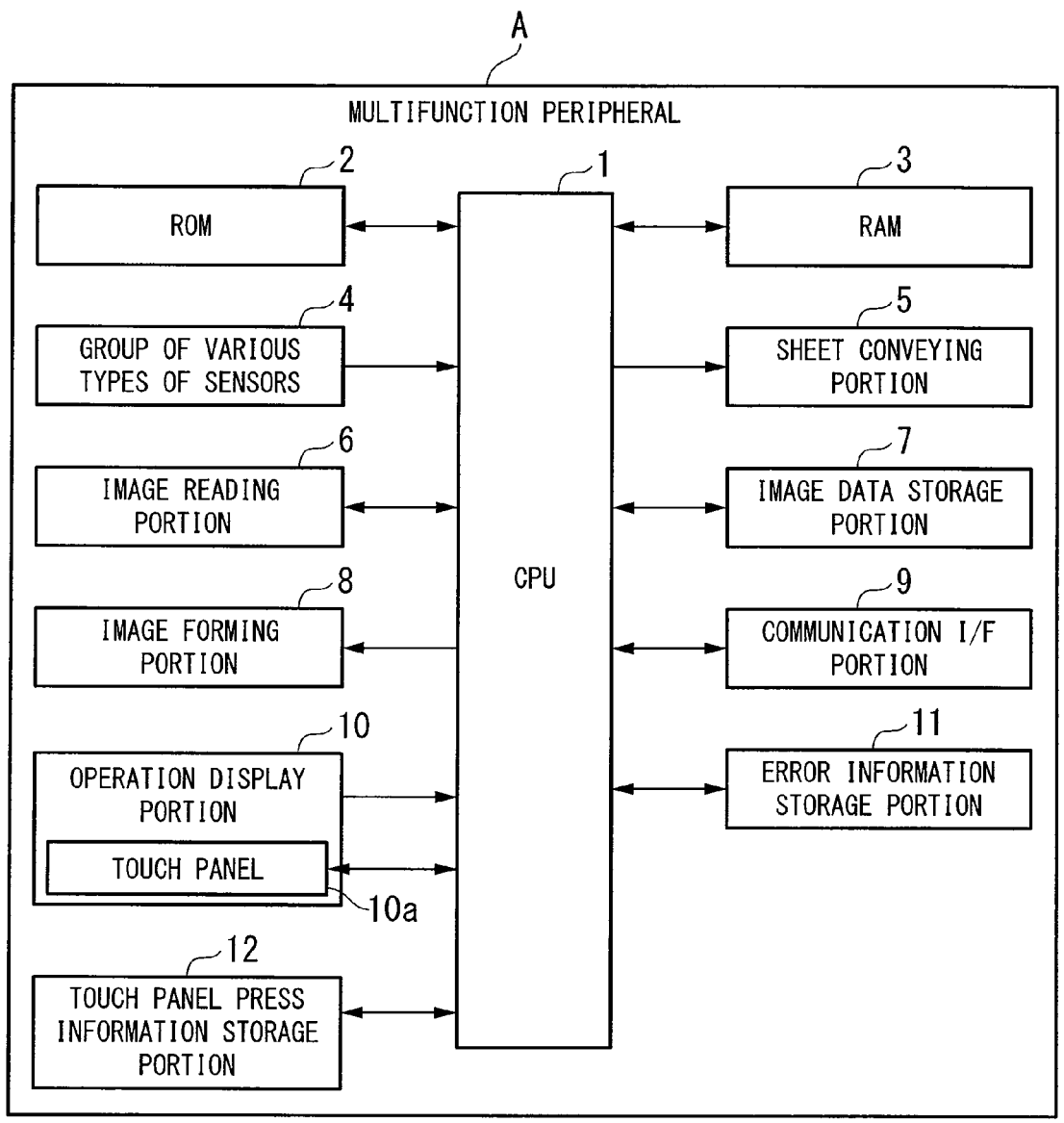
FIG. 1 is a function block diagram of a multifunction peripheral according to an embodiment of the present invention.

Firstly, the functional configuration of a multifunction peripheral A will be explained while referring to FIG. 1. FIG. 1 is a function block diagram of the multifunction peripheral A according to this embodiment.

The multifunction peripheral A includes a central processing unit (CPU) 1, a read only memory (ROM) 2, a random access memory (RAM) 3, a group of various types of sensors 4, a sheet conveying portion 5, an image reading portion 6, an image data storage portion 7, an image forming portion 8, a communication I/F portion 9, an operation display portion 10, an error information storage portion 11, and a touch panel press information storage portion 12.

The CPU 1 controls the operations of the multifunction peripheral. The CPU 1 controls all operations of the multifunction peripheral A based on a control program stored in the ROM 2, various types of detection signals received from the group of various types of sensors 4, screen data of original document, print screen data, and facsimile screen data stored in the image data storage portion 7, various types of commands inputted from client computers (not shown) and public networks (not shown) via the communication I/F portion 9, and operation commands inputted from the operation display portion 10. The public networks include public telephone networks and public internet. A control process of the CPU 1 will be explained below as an operation (working) of the multifunction peripheral A.

The ROM 2 is a nonvolatile memory that stores a control program executed by the CPU 1 and other data.

The RAM 3 is a volatile memory used as a working area for temporarily storing data when the CPU 1 executes the control program and performs various types of operations.

The group of various types of sensors 4 includes various sensors required in an image formation operation, such as, for example, a paper out detection sensor, a paper blockage detection sensor, a paper position detection sensor, and a temperature sensor, and outputs various types of information detected by these sensors as a detection signal to the CPU 1.

The sheet conveying portion 5 includes conveyance roller and a motor for driving the conveyance roller, which conveys printing paper sheets (paper) stored in a paper tray to the image forming portion 8, and conveyance roller and a motor for driving the conveyance roller, which conveys the printing paper sheets after an image formation process is executed to a catch tray (not shown).

The image reading portion 6 includes an automatic document feeder (ADF), a charge coupled device (CCD) sensor, and the like. The image reading portion 6 makes the CCD sensor capture an image of an original document that is sequentially supplied by the ADF, and outputs an image data of original document based on the original document image. The image reading portion 6 outputs the image data of the original document to the CPU 1, and the CPU 1 stores the image data of the original document in the image data storage portion 7.

The image data storage portion 7 is, for example, a flash memory or a hard disk. In compliance with a command from the CPU 1, the image data storage portion 7 stores the image data of the original document (original document image data), print image data which received by the communication I/F portion 9 from a client computer (not shown), and facsimile image data which received by the communication I/F portion 9 from a public network (not shown).

In compliance with controls of the CPU 1, based on the image data of the original document, print image data, and facsimile image data which are stored in the image data storage portion 7, the image forming portion 8 transfers an image-formation image formed by toner on the printing paper sheet conveyed from the sheet conveying portion 5, and performs a process of fixing the image-formation image using fixing rollers (not shown).

The communication I/F portion 9 connects with an external client computer and a public network, and transmits/receives various types of signals to/from them.

The operation display portion 10 includes a copy function switch key, a print function switch key, a scan function switch key, a facsimile function switch key, a start key, a stop/clear key, a power key, a ten-keypad (numerical entry key), a touch panel 10a, and various other types of keys. The operation display portion 10 outputs operation commands from these keys to the CPU 1, and displays various screens on the touch panel 10a, in compliance with the CPU 1. Incidentally, the copy function switch key, the print function switch key, the scan function switch key, and the facsimile function switch key are for switching between operation modes for the various functions of the multifunction peripheral A when a user uses those functions.

The touch panel 10a employs a resistive film analog detection method (four-wire type or seven-wire type); in compliance with the CPU 1, the touch panel 10a displays a predetermined operation screen, and outputs to the CPU 1 a user press position corresponding to the operation screen. The touch panel 10a includes a liquid crystal display portion (not shown), a press sensor portion (not shown), and an A/D conversion portion (not shown).

The press sensor portion detects a press position based on the resistive film analog detection method, and outputs an x-axis detection voltage and a y-axis detection voltage indicating the press position to the A/D conversion portion. The press sensor portion includes a pair of resistive films which are affixed to the display plane (operation plane) of the liquid crystal display portion and face to each other with a narrow gap, a DC power source that applies a predetermined reference voltage to the resistive films, a circuit that outputs to the outside a resistance-divided voltage of the reference voltage obtained when the resistive films contact each other due to a user pressed the surface of the resistive film, and such like.

Figure 2:
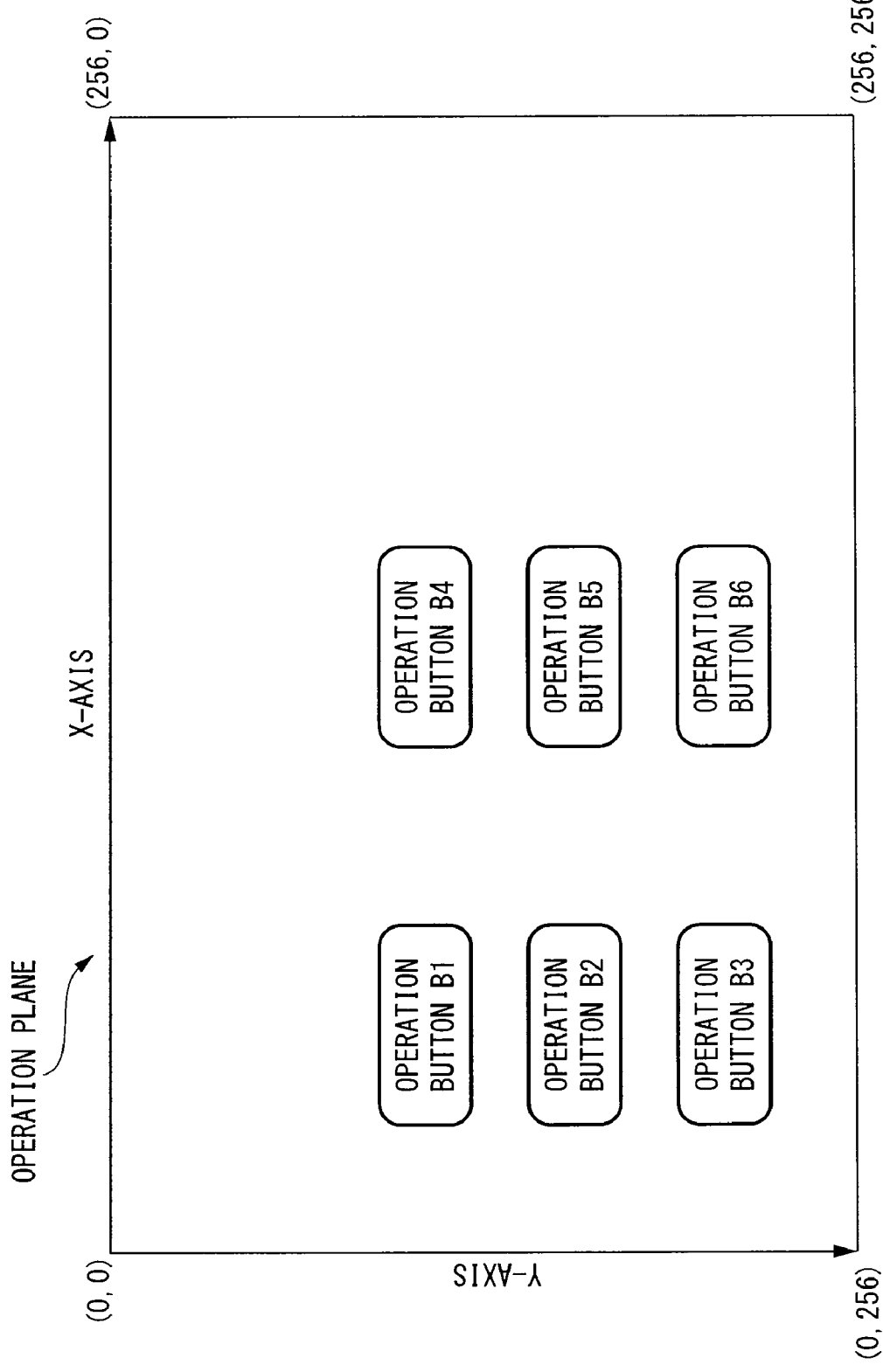
FIG. 2 is a schematic view showing an operation screen (display screen) of a touch panel of a multifunction peripheral according to an embodiment of the present invention.

The x-axis detection voltage is obtained by resistance-dividing a predetermined reference voltage in accordance with the press position, and constitutes a voltage signal indicating an x-coordinate of the press position on the operation plane. The y-axis detection voltage is obtained by resistance-dividing a predetermined reference voltage in accordance with the press position, and constitutes a voltage signal indicating a y-coordinate of the press position on the operation plane. As shown in FIG. 2, when the top-left corner of the operation plane is at the origin (0, 0) and the bottom-right corner is at point (256, 256), the x-axis detection voltage and the y-axis detection voltage have smaller values when the press position is near to the origin (0, 0), and have larger values when it is further away from the origin (0, 0) (i.e. nearer to point (256, 256)). That is, the x-axis detection voltage and the y-axis detection voltage are detection signals (analog signals) that use voltage values to indicate the x-axis and y-axis coordinates of the press position.

The A/D conversion portion converts the x-axis detection voltage to x-axis detection data which is a digital signal, converts the y-axis detection voltage to y-axis detection data which is a digital signal, and outputs the x-axis detection data and y-axis detection data to the CPU 1. The CPU 1 detects the coordinates of the press position based on the x-axis detection data and the y-axis detection data.

The error information storage portion 11 is, for example, a flash memory, which stores various types of error information for use in the error analyses by the person who analyzing malfunction, when various errors occur in the multifunction peripheral A, in compliance with the control of the CPU 1.

The touch panel press information storage portion 12 is a volatile memory and the like for temporarily storing data, and stores a touch panel press information table in which touch panel press information relating to pressing of the touch panel 10a is recorded, in compliance with the CPU 1.

FIG. 3 is a schematic view showing the touch panel press information table. As shown in FIG. 3, in the touch panel press information table, touch panel press information is recorded for each touch panel press information number. As shown in FIG. 3, a touch panel press position, a touch panel press time (timing), and a touch panel press screen ID are recorded as the touch panel press information. A touch panel press information number is an identification number which is allocated every time a piece of touch panel press information is recorded in the touch panel press information table.

Each time the user presses the touch panel 10a, the CPU 1 stores a touch panel press position, a touch panel press time, and a touch panel press screen ID in the touch panel press information table. The touch panel press position indicates x-axis and y-axis coordinates of the press position on the touch panel 10a. The touch panel press time indicates the timing at which the touch panel 10a was pressed. The touch panel press screen ID indicates the ID of a screen that was being displayed on the touch panel 10a at the time it was pressed.

While in this embodiment, a touch panel press position, a touch panel press time, and a touch panel press screen ID are recorded simultaneously as touch panel press information in the touch panel press information table, this is not limitative of the invention. Alternatively, it is possible to only record the touch panel press position as the touch panel press information in the touch panel press information table. The touch panel press position and the touch panel press time can be recorded as the touch panel press information in the touch panel press information table. Alternatively, the touch panel press position and the touch panel press screen ID can be recorded as touch panel press information in the touch panel press information table.

In this embodiment, a method for forming error information using the electronic device described above includes detecting a press position of the touch panel; storing the press position of the touch panel as first press information of the touch panel in a first storage portion; determining (whether there is) an error in the electronic device; and creating a screen data with a mark which indicates the press position on the operation screen at the time the error occurred, based on the first press information, and forming first error information based on the screen data, when an error occurs in the electronic device.

Figure 4:
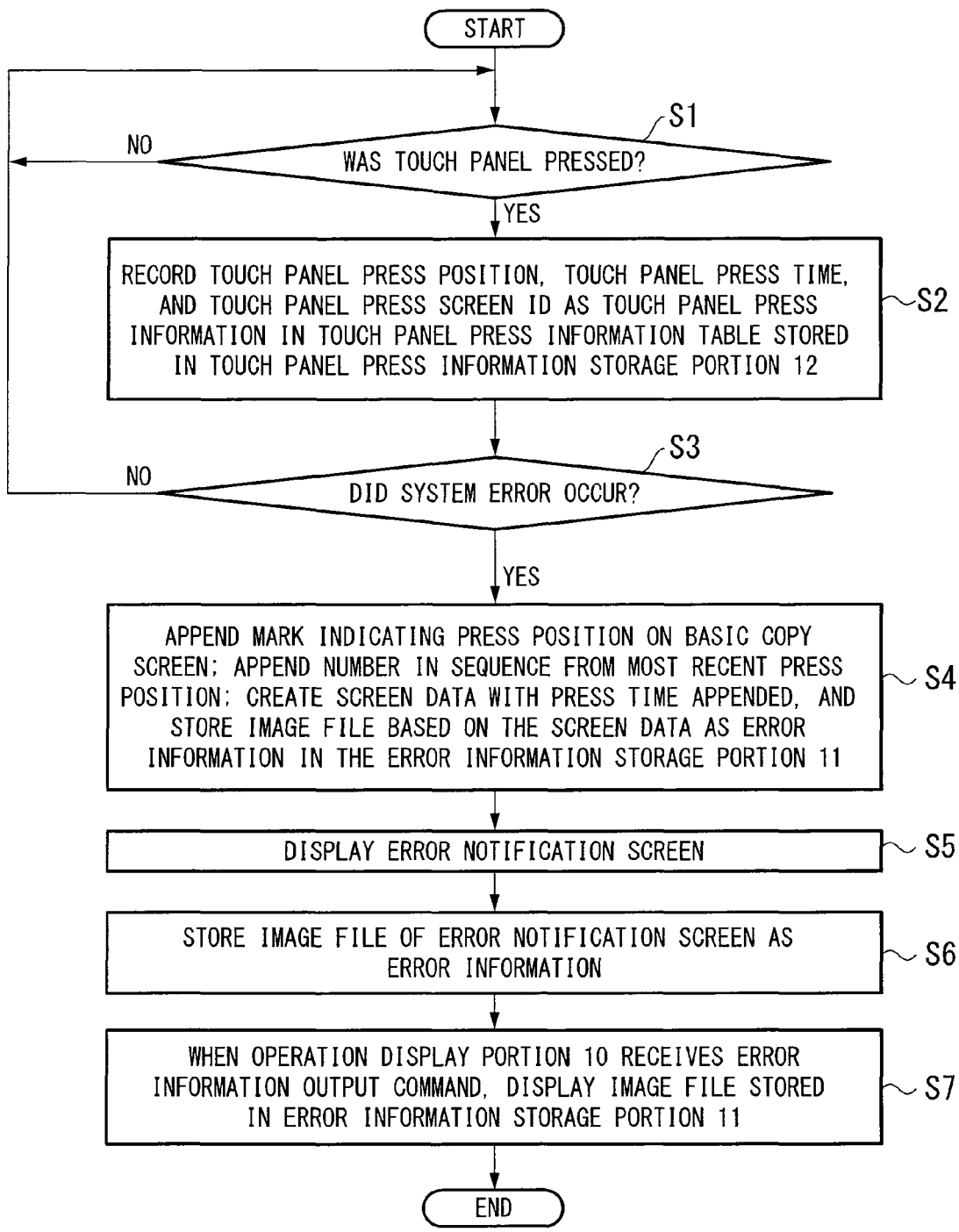
FIG. 4 is a flowchart showing an operation of a multifunction peripheral according to an embodiment of the present invention.

Subsequently, an operation of the multifunction peripheral A according to the embodiment having the configuration described above will be explained in detail with reference to FIG. 4. FIG. 4 is a flowchart of an operation of the multifunction peripheral A according to this embodiment.

Firstly, a user who intends to use the multifunction peripheral A to copy an original document sets copy conditions for a copy process by manipulating the basic copy screen and/or the operation display portion 10 displayed by the touch panel 10a. The basic copy screen is a top screen in the copy function of the multifunction peripheral A, and displays display buttons of setting-selection screen for displaying a setting-selection screen that allows the user to select a value for each setting of the copy conditions.

Based on x-axis detection data and y-axis detection data inputted from the touch panel 10a, the CPU 1 determines whether the touch panel 10a has been pressed (step S1). When it determines 'No' in step S1, i.e. when the touch panel 10a has not been pressed, the CPU 1 waits until the touch panel 10a is pressed. When the CPU 1 (first control unit) determines 'Yes' in step S1, i.e. when it determines that the touch panel 10a has been pressed, the CPU 1 stores a touch panel press position based on the x-axis detection data and y-axis detection data, a touch panel press time, and a touch panel press screen ID as touch panel press information in the touch panel press information table stored in the touch panel press information storage portion 12 (first storage portion), and allocates a touch panel press information number to the touch panel press information (step S2).

Following step S2, the CPU 1 determines whether a system error has occurred (step S3). The above mentioned system error is an error caused by a malfunction during a control process executed by the CPU 1 based on the control program. For examples, the system error can include an overflow of a heap area (i.e., heap overflow) of the RAM 3 caused by repeating non-deallocate of a dynamic memory from the heap area of the RAM 3, and an overflow of the stack area (i.e., stack overflow) of the RAM 3 caused by infinite repetition of a restart process, during the control process.

When it determines 'No' in step S3, i.e. there is no system error, the CPU 1 shifts to step S1. That is, every time the touch panel 10a is pressed, the CPU 1 keeps recording touch panel press information in the touch panel press information table stored in the touch panel press information storage portion 12, until a system error has occurred. When it determines 'Yes' in step S3, i.e. a system error has occurred, the CPU 1 (second control unit) appends a mark which indicates the press position on the basic copy screen displayed when the error occurred, and appends numbers in sequence from the most recent press position based on the touch panel press information table; in addition, it creates a screen data with the press time appended thereto, and converts the screen data to an image file with a format such as JPEG or GIF, and stores this image file as error information in the error information storage portion 11 (step S4).

Figure 5:
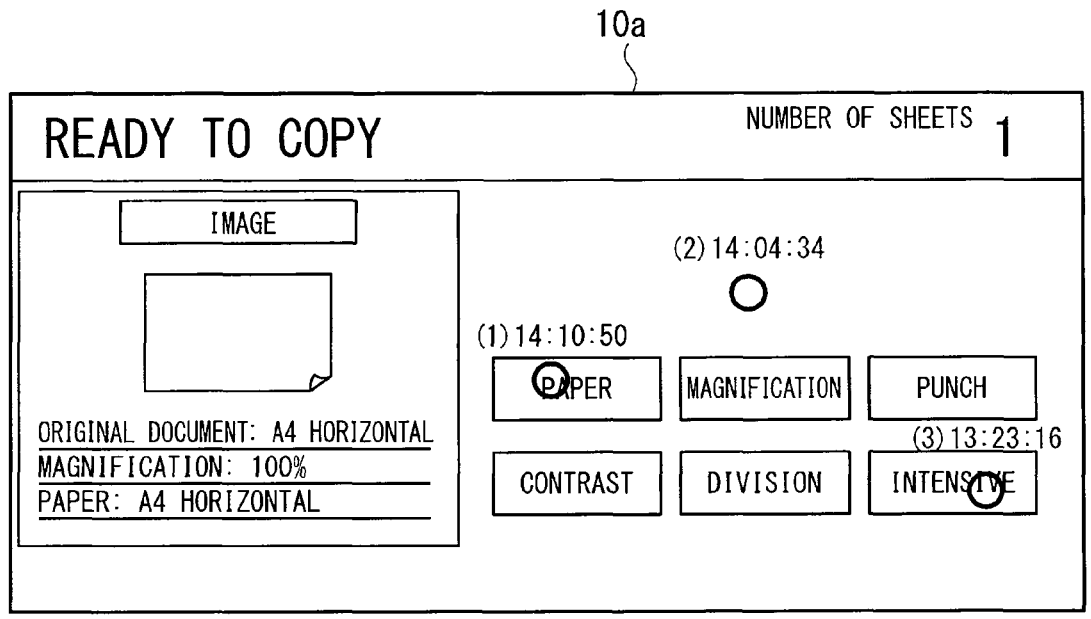
FIG. 5 is a view showing a basic copy screen when a CPU of a multifunction peripheral appends circular marks at pressing positions according to an embodiment of the present invention.
Figure 6:
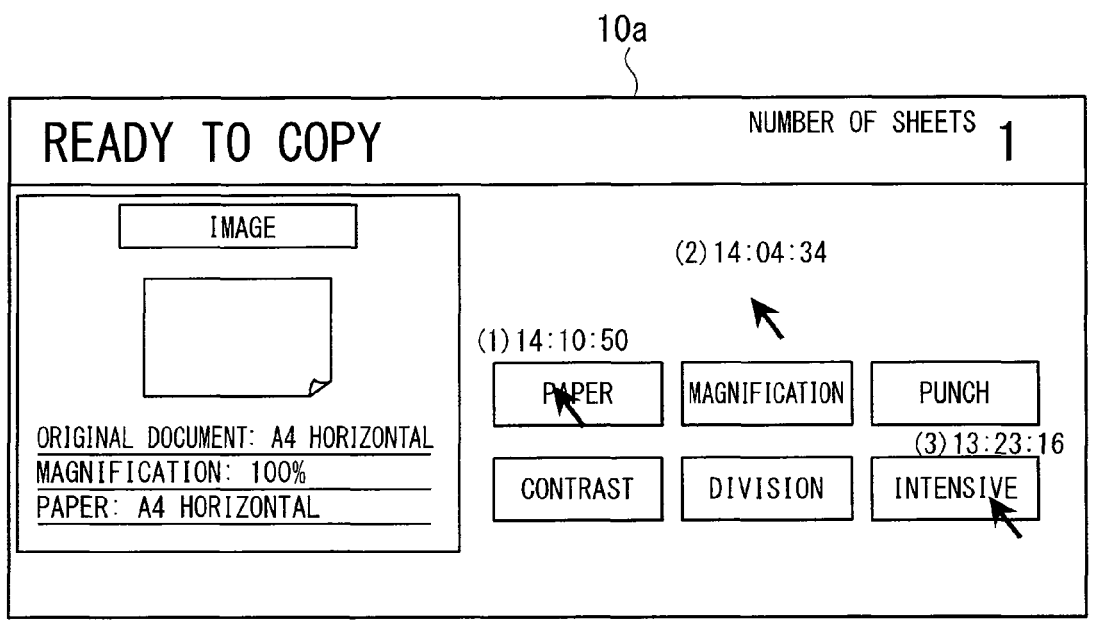
FIG. 6 is a view showing a basic copy screen when a CPU of a multifunction peripheral appends arrow marks at pressing positions according to an embodiment of the present invention.

FIG. 5 is a view showing a basic copy screen when the CPU 1 of the multifunction peripheral A according to this embodiment has appended circular marks at the press positions. FIG. 6 is a view showing a basic copy screen when the CPU 1 of the multifunction peripheral A according to this embodiment has appended arrow marks at the press positions. When the CPU 1 appends mark at the press position on the basic copy screen based on the touch panel press information table shown in FIG. 3 in step S4, if the basic copy screen has a screen ID of 'W002', as shown in FIGS. 5 and 6, the CPU 1 appends circular or arrow marks indicating press positions of touch panel press information numbers '0002' to '0004' to the basic copy screen. As shown in FIGS. 5 and 6, the CPU 1 then appends numbers (1) to (3) sequentially from the most recent press position, that is, in the sequence of press positions with touch panel press information numbers '0004', '0003', and '0002' of FIG. 3; and the CPU 1 also appends press times.

Following step S4, the CPU 1 displays an error notification screen noticing that a system error has occurred on the touch panel (step S5). Thereafter, the CPU 1 converts the screen data of the error notification screen displayed on the touch panel 10a to an image file with a format such as JPEG or GIF, and stores the image file of the error notification screen as an error information in the error information storage portion 11 (second storage portion) (step S6). When the operation display portion 10 receives an error information output command through key operation, the CPU 1 (third control unit)

displays the image file stored as an error information in the error information storage portion 11 on the touch panel 10*a* (step S7).

As described above, in the multifunction peripheral A according to this embodiment, the CPU 1 records a press position of the touch panel 10*a*, a press time, and a touch panel press screen ID which is the screen at the time of pressing, into the touch panel press information table stored in the touch panel press information storage portion 12. When an error occurs, based on the touch panel press information table, the CPU 1 creates a screen data with mark indicating the press position on the screen displayed when the error occurred, and the press time, appended thereto, and stores an image file based on that screen data as error information in the error information storage portion 11. Moreover, when the touch panel 10*a* is pressed a plurality of times, the CPU 1 creates a screen data with marks indicating the plurality of press positions appended thereto, and appends numbers to each those marks in sequence from the most recent press position.

Thus the CPU 1 creates a screen data with a mark which indicates the press position on the touch panel 10*a*, and stores an image file based on the screen data as error information. According to this multifunction peripheral A, even if an error results from pressing the touch panel 10*a*, the analyst can accurately and rapidly identify the cause of the error based on the mark which indicates the press position appended to the screen stored as error information, the analysis efficiency can be improved.

When the conventional technology described above is applied in an electronic device including a touch panel, while it is possible to retain the screen displayed on the touch panel when the error occurred as error information, it is not possible to retain press information of the touch panel as error information. Consequently, if the error was caused by pressing the touch panel, it is very difficult for the analyst of the malfunction to identifying its cause from the error information. Since this conventional technology cannot retain touch panel press information as error information, i.e. it cannot retain sufficient useful information for analyzing malfunction, it cannot sufficiently improve the efficiency of the malfunction analysis. In comparison, this embodiment can accurately and rapidly determine the cause of the error based on the mark which indicates the press position appended to the screen, and can improve the efficiency of the malfunction analysis.

A case where a touch panel press position is stored as touch panel press information in the touch panel press information table will be simply explained. In the following explanation, points similar to those in the embodiment already described above are not repetitiously explained.

In a case where a touch panel press position is recorded as touch panel press information, when the CPU 1 determines that the touch panel was pressed in the above step S2, the CPU 1 records a touch panel press position based on x-axis detection data and y-axis detection data as touch panel press information in the touch panel press information table stored in the touch panel press information storage portion 12. In addition, the CPU 1 allocates a touch panel press information number. Thereafter, when an error occurs, the CPU 1 creates a screen data with a mark which indicates the press position on a basic copy screen displayed when the system error occurs, and stores an image file based on that screen data as error information in the error information storage portion. In this case, the error notification screen displays the screen with circular or arrow marks appended thereto at the press positions shown in FIG. 5 and FIG. 6, without the press times.

In this embodiment described above, as shown in FIGS. 5 and 6, the touch panel 10*a* is pressed three times, but the invention is not limited to this, and can be similarly applied when the touch panel 10*a* is pressed once.

Furthermore, in this embodiment describes an example where the multifunction peripheral A copies an original document, but the invention is not limited to this. For example, when using the multifunction peripheral A to scan an original document, the CPU 1 stores touch panel press information such as the press position on the touch panel 10*a*, the press time, and the touch panel press screen ID of the screen when it is pressed in the touch panel press information storage portion 12. If an error occurs, based on this touch panel press information, the CPU 1 creates a screen data with a mark which indicates the press position and a press time on the screen displayed when the error occurred, and stores an image file based on the screen data as error information in the error information storage portion 11. Therefore, when an error is caused by pressing the touch panel 10*a* while using the multifunction peripheral A to scan an original document, the analyst can accurately and rapidly determine the cause of the error based on the press position, the press time, the press screen, and such like, at the time the error occurred, thereby the efficiency of the malfunction analysis can be improved.

Furthermore, when using the multifunction peripheral A to fax an original document or perform another operation, as already described, when an error occurs due to pressing the touch panel 10*a*, the analyst can accurately and rapidly determine the cause of the error based on the press position, press time, press screen, or the like at the time the error occurred, the efficiency of the malfunction analysis can be improved.

While an embodiment of the present invention was explained above, this is not limitative of the invention, which can, for example, be modified as follows.

(1) The embodiment described above applies the present invention in a multifunction peripheral used as an image forming apparatus, which is one kind of electronic device. However, the invention can be applied in any electronic device that is operated via a touch panel. Examples of such an electronic device include an automatic telling machine (ATM), a satellite navigation system, a mobile information terminal device, etc.

(2) The press sensor portion of the touch panel 10*a* in the embodiment detects a press position using resistive film analog detection method. However, the invention is not limited to a press sensor that uses resistive film analog detection method (analog resistance film type).

According to one feature of the present invention, for example, by executing the control program, the CPU 1 creates a screen data for a screen with marks indicating press positions on the touch panel 10*a* appended thereto. The present invention can also be applied in an electronic device including any type of touch panel, no matter what method the press sensor uses.

(3) In the above described embodiment, when the operation display portion 10 receives an error information output command, the CPU 1 displays an image file stored as error information in the error information storage portion 11 on the touch panel 10*a*, but the invention is not limited to this.

Alternatively, for example, based on a command from a personal computer (not shown) connected with the communication I/F portion 9 of the multifunction peripheral A, the CPU 1 outputs error information stored in the error information storage portion 11 to the personal computer. The analyst can then display an image file of the error information on the display of the personal computer, and analyze the error.

(4) In the above described embodiment, the CPU 1 converts screen data of an error notification screen displayed on the touch panel 10*a* to an image file, and stores that image file as error information in the error information storage portion 11, but the invention is not limited to this.

If the display content of the screen is always constant such as an error notification screen, instead of an image file, it is possible to store an identifier, such as the touch panel press screen ID of the screen, as the error information in the error information storage portion 11. By storing a screen identifier in the error information storage portion 11, pressure on the capacity of the error information storage portion 11 can be suppressed more than when storing a screen data image file.

(5) In the above described embodiment, when a system error occurs, the CPU 1 appends marks indicating press positions on the basic copy screen displayed when the system error occurred, and appends numbers in sequence from the most recent press position, and creates a screen data with the press times appended thereto, but the invention is not limited to this.

In addition to marks which indicate press positions, numbers which indicate the sequence from the most recent press position, and the press times, the CPU 1 can append coordinates of press position (e.g. (X1, Y1)), based on the touch panel press information in the touch panel press information table.

An electronic device according to one of the aspects of the present invention includes a touch panel that displays various operation screens on an operation plane, and detects a press position on the operation screen as a detection signal. The electronic device further includes: a storage portion of touch panel press information that stores touch panel press information; a storage portion of error information that stores error information; a control unit for controlling the storage of touch panel press information that stores a press position indicated by the detection signal as touch panel press information in the storage portion of touch panel press information, when the detection signal is inputted from the touch panel; a control unit for controlling the storage of error information that creates a screen data with a mark which indicates a press position of an operation screen on the operation screen displayed when the error occurred in the touch panel, based on the touch panel press information stored in the storage portion of touch panel press information, and stores the screen data as error information in the storage portion of error information, when an error occurs; and an output control unit that outputs the error information based on an error information output command.

Thus the electronic device creates a screen data with a mark which indicates the press position of the touch panel, and stores that screen data as error information. Therefore, when an error occurs due to pressing the touch panel, the analyst can accurately and rapidly determine the cause of the error based on the mark which indicates the press position that is appended to the screen data stored as error information, efficiency of the malfunction analysis can be improved.

While several embodiments of the present invention have been described above, it should be understood that these are exemplary of the present invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

The present invention will now be summarized from the above described embodiments. An electronic device according to an aspect of the present invention includes: a touch panel that includes an operation plane which displays various operation screens, and detects a press position on the operation plane as a detection signal; a first storage portion that stores press information of the touch panel; a second storage portion that stores error information; a first control unit that stores the press position indicated by the detection signal from the touch panel as first press information in the first storage portion; a second control unit that creates a screen data with a mark which indicates the press position on the operation screen when an error occurred, based on the first press information stored in the first storage portion, and stores the screen data as first error information in the second storage portion, when the error occurs in the electronic device; and a third control unit that outputs the error information based on an error information output command.

When a plurality of the press positions are stored as the first press information in the first storage portion, the second control unit can create the screen data with marks which indicate the plurality of press positions on the operation screen when the error occurred.

The second control unit can create the screen data with numbers which identify a press sequence of the press positions on the operation screen when the error occurred, in addition to the plurality of press positions.

The first control unit can store a press time as second press information in the first storage portion, and, when an error occurs in the electronic device, based on the first press information and the second press information stored in the first storage portion, the second control unit can create the screen data with a position indicating the press position and a press time on the operation screen when the error occurred.

When an error occurs in the electronic device, based on the first press information stored in the first storage portion, the second control unit can create the screen data with a mark which indicates the press position and coordinates which indicate the press position on the operation screen when the error occurred.

The second control unit can store screen data of an error notification screen as second error information in the second storage portion.

A method for forming an error information of an electronic device according to another aspect of the present invention includes: detecting a press position of a touch panel; storing the press position of the touch panel as first press information of the touch panel in a first storage portion; determining an error caused in the electronic device; and creating a screen data including a mark that indicates the press position on the operation screen when the error occurred, based on the first press information stored in the first storage portion, and forming first error information based on the screen data, when the error occurs.

When a plurality of press positions are stored in the first storage portion as the first press information, the forming the first error information can further include creating the screen data with marks which indicate the plurality of press positions on the operation screen when the error occurred.

The forming the first error information can further include creating the screen data with number identifying the press sequence of the press positions, in addition the plurality of the press positions on the operation screen when the error occurred.

The method for forming error information of the electronic device can further include storing a press time and a touch panel screen when the error occurred, as second press information in the first storage portion.

The method for forming error information of the electronic device can further include storing a screen data of an error notification screen as second error information in the second storage portion.

An image formation apparatus according to another aspect of the present invention includes: an image forming portion that forms an image on a paper sheet; a touch panel that includes an operation plane displaying various types of operation screens, and detects press position on the operation screen; a storage portion that stores at least press information of the touch panel; and a control unit that creates screen data with mark which indicates the press positions on the operation screen when an error occurred, based on the press position detected by the touch panel, and stores the screen data in the storage portion, when the error occurs in the image forming apparatus.

The storage portion can include a first storage portion that stores press information of the touch panel, and a second storage portion that stores the screen data as error information.

When a plurality of press positions are stored as press information of the touch panel in the first storage portion, the control unit can create the screen data with marks which indicate the plurality of press positions on the operation screen when the error occurred.

The control unit can create the screen data with numbers which identify a press sequence of the press positions on the operation screen when the error occurred, in addition to the plurality of press positions.

The control unit can further store a press time in the storage portion, and can create screen data with a position which indicates the press position and the press time on the operation screen when the error occurred, based on the press position and the press time, when an error occurs in the image forming apparatus.

When the error occurs in the image forming apparatus, the control unit can create the screen data with the mark which indicates the press position and coordinate which indicates the press position on the operation screen when the error occurred, based on the press position.

The control unit can store a screen data of an error notification screen in the storage portion.

The image forming portion can form at least one of an image of a read original document and an image received from the outside (extraneous image) on the paper sheet.

Based on an error information output command, the control unit can output the screen data with the mark which indicates the press position on the operation screen when the error occurred.

What is claimed is:

1. An electronic device comprising:
   a touch panel that includes an operation plane which displays various operation screens, and detects a press position on the operation plane as a detection signal;
   a first storage portion that stores press information of the touch panel;
   a second storage portion that stores error information;
   a first control unit that stores the press position indicated by the detection signal from the touch panel as first press information in the first storage portion;
   a second control unit that creates a screen data with a mark which indicates the press position on the operation screen when an error occurred, based on the first press information stored in the first storage portion, and stores the screen data as first error information in the second storage portion, when the error occurs in the electronic device; and
   a third control unit that outputs the error information based on an error information output command.

2. The electronic device according to claim 1, wherein when a plurality of the press positions are stored as the first press information in the first storage portion, the second control unit creates the screen data with marks which indicate the plurality of the press positions on the operation screen when the error occurred.

3. The electronic device according to claim 2, wherein the second control unit creates the screen data with numbers which identify a press sequence of the press positions on the operation screen when the error occurred, in addition to the plurality of press positions.

4. The electronic device according to claim 1, wherein the first control unit stores a press time as second press information in the first storage portion; and
   the second control unit creates the screen data with a position which indicates the press position and the press time on the operation screen when the error occurred, based on the first press information and the second press information stored in the first storage portion, when the error occurs in the electronic device.

5. The electronic device according to claim 1, wherein, the second control unit creates the screen data with the mark which indicates the press position and coordinate which indicates the press position on the operation screen when the error occurred, based on the first press information stored in the first storage portion, when an error occurs in the electronic device.

6. The electronic device according to claim 1, wherein, the second control unit stores screen data of an error notification screen as second error information in the second storage portion.

7. A method for forming error information of an electronic device, the method comprises:
   detecting a press position of a touch panel;
   storing the press position of the touch panel as first press information of the touch panel in a first storage portion;
   determining an error caused in the electronic device; and
   creating a screen data with a mark which indicates the press position on the operation screen when the error occurred, based on the first press information stored in the first storage portion, and forming first error information based on the screen data, when the error has occurred.

8. The method according to claim 7, wherein the forming the first error information further comprises creating the screen data with marks which indicate a plurality of the press positions on the operation screen when the error occurred, when the plurality of the press positions are stored in the first storage portion as the first press information.

9. The method according to claim 8, wherein the forming the first error information further comprises creating the screen data with numbers which identify a press sequence of the press positions on the operation screen when the error occurred, in addition to the plurality of press positions.

10. The method according to claim 7, further comprising: storing a press time and a touch panel screen when the error occurred as second press information in the first storage portion.

11. The method according to claim 7, further comprising: storing a screen data of an error notification screen as second error information in the second storage portion.

12. An image forming apparatus comprising:
- an image forming portion that forms an image on a paper sheet;
- a touch panel that includes an operation plane which displays various types of operation screens, and detects a press position on the operation plane;
- a storage portion that stores at least press information of the touch panel; and
- a control unit that creates a screen data with mark which indicates the press position on the operation screen when an error occurred, based on the press position detected by the touch panel, and stores the screen data in the storage portion, when the error occurs in the image forming apparatus.

13. The image forming apparatus according to claim 12, wherein
the storage portion comprises a first storage portion that stores press information of the touch panel, and a second storage portion that stores the screen data as error information.

14. The image forming apparatus according to claim 13, wherein
the control unit creates the screen data with marks which indicate a plurality of press positions on the operation screen when the error occurred, when the plurality of press positions are stored as press information of the touch panel in the first storage portion.

15. The image forming apparatus according to claim 14, wherein
the control unit creates the screen data with numbers which identify a press sequence of the press positions on the operation screen when the error occurred, in addition to the plurality of press positions.

16. The image forming apparatus according to claim 12, wherein
the control unit further stores a press time in the storage portion, and, when the error occurs in the image forming apparatus, the control unit creates the screen data with a position which indicates the press position and the press time on the operation screen when the error occurred, based on the press position and the press time.

17. The image forming apparatus according to claim 12, wherein
the control unit creates the screen data with the mark which indicates the press position and coordinate which indicates the press position on the operation screen when the error occurred, based on the press position, when the error occurs in the image forming apparatus.

18. The image forming apparatus according to claim 12, wherein
the control unit stores a screen data of an error notification screen in the storage portion.

19. The image forming apparatus according to claim 12, wherein
the image forming portion forms at least one of an image of a read original document and an image received from the outside on the paper sheet.

20. The image forming apparatus according to claim 12, wherein
the control unit outputs the screen data with the mark which indicates the press position on the operation screen when the error occurred, based on an error information output command.

* * * * *